United States Patent [19]

Andrews et al.

[11] Patent Number: 4,520,119

[45] Date of Patent: May 28, 1985

[54] CRACKING CATALYST AND MANUFACTURE THEREOF

[75] Inventors: Robert W. Andrews, Toms River; Francis L. Himpsl, Matawan; Eugene B. Horvath, Freehold; Barry K. Speronello, River Edge, all of N.J.

[73] Assignee: Engelhard Corporation, Edison, N.J.

[21] Appl. No.: 532,346

[22] Filed: Sep. 15, 1983

[51] Int. Cl.$^3$ .............................................. B01J 29/08
[52] U.S. Cl. ......................................... 502/67; 502/64
[58] Field of Search ......................... 502/66, 67, 68, 64

[56] References Cited

U.S. PATENT DOCUMENTS

| | | | |
|---|---|---|---|
| 3,329,628 | 7/1967 | Gladrow et al. | 502/66 X |
| 3,451,948 | 6/1969 | Scott | 252/455 |
| 3,458,454 | 7/1969 | Lapides et al. | 252/455 |
| 3,506,594 | 4/1970 | Haden, Jr. et al. | 502/68 |
| 3,515,682 | 6/1970 | Flank et al. | 252/455 |
| 3,515,683 | 6/1970 | Flank et al. | 252/455 |
| 4,406,823 | 9/1983 | Laurent et al. | 502/67 |

*Primary Examiner*—Carl F. Dees
*Attorney, Agent, or Firm*—Inez L. Moselle

[57] ABSTRACT

By-product fines from the manufacture of zeolitic cracking catalysts from microspheres of calcined clay have heretofore been discarded as a waste stream. These fines, recovered as a moist cake, are slurried in a sodium, silicate solution, spray dried to form microspheres and ion-exchanged to produce cracking catalysts which produce low levels of coke during use.

17 Claims, No Drawings

CRACKING CATALYST AND MANUFACTURE THEREOF

BACKGROUND OF THE INVENTION

The invention relates to a process for producing novel attrition-resistant fluidizable petroleum cracking catalysts from zeolite-containing fines produced as a side stream in the manufacture of fluidizable zeolitic cracking catalysts from preformed microspheres of calcined clay(s). In particular, the invention relates to a procedure for making zeolitic cracking catalysts, useful in the fluidized catalytic cracking (FCC) of hydrocarbon feedstocks, from the nominally minus 20 micron sized fine particles generated in practice of "in situ" catalyst manufacturing technology such as described in U.S. Pat. No. 3,647,718.

Crystalline zeolitic molecular sieves are used in a wide variety of catalytic and adsorptive applications. Sieves of the faujasite type, especially ion-exchanged forms of zeolite Y, are well-known constituents of hydrocarbon conversion catalysts. In commercial practice, synthetic forms of zeolite Y, in particular forms of zeolite Y having a $SiO_2/Al_2O_3$ molar ratio above about 4, are utilized as a component of such catalysts.

Synthetic zeolites of the Y-type are commercially available as finely divided high purity crystals. Present commercial use of such zeolites in the fluidized cracking of hydrocarbons requires that the zeolite crystals in the particles of catalyst be associated with a suitable material, sometimes referred to as the matrix, such as a silica-alumina gel, clay or mixture thereof, to provide catalyst particles which operate at activity levels useful in present day cracking units. The matrix material also functions to impart attrition resistance to the catalyst particles, and is a heat transfer medium between the reaction and regeneration sections of the fluid catalytic cracking unit. It is well known that the pore structure and chemical composition of the matrix may have a significant effect on the activity and selectrivity of the catalyst. When preparing cracking catalysts from fine particle size crystals, the choice of a matrix is limited by the fact that the matrix must be thermally stable, provide access of gases or liquids to the zeolite crystals in the composite particles and result in particles of acceptable resistance to attrition.

The synthesis of a variety of zeolites from calcined clays, especially kaolin clay, is known. For example, metakaolin (kaolin clay calcined at a temperature of about 1200° to 1500° F.) will react with sodium hydroxide solution to produce sodium zeolite A. On the other hand, metakaolin can react with sodium silicate solutions under selected conditions to form synthetic zeolites of the faujasite type (so-called zeolite X and zeolite Y). When kaolin is calcined under more severe conditions, sufficient to undergo the characteristic exothermic reation (for example calcination at about 1700° to 2000° F.), the calcined clay will react with sodium hydroxide solution under controlled conditions to synthesize faujasite-type zeolites.

The reaction between kaolin calcined to undergo the exotherm and sodium hydroxide in an aqueous reaction medium is quite sensitive to the history of the clay prior to and during calcination. It is known that the addition of a minor amount of metakaolin relative to kaolin calcined to undergo the exotherm frequently assures that a desired amount of synthetic faujasite, especially zeolite Y having a desirably high $SiO_2/Al_2O_3$ ratio, will be crystallized under commercially viable production conditions.

Processes for producing commercially successful zeolitic cracking catalysts useful in moving bed and fluidized (FCC) cracking units utilize the concept of employing calcined clay reactant(a) in substantially the same size and shape as the desired catalyst product. Because the bodies are zeolitized directly without a separate binding step to composite zeolite and binder, the technology is frequently referred to as "in situ" processing. Reference is made to the following commonly assigned patents of Haden et al. as examples of such processes: U.S. Pat. Nos. 3,367,886; 3,367,887; 3,433,587; 3,503,900; 3,506,594; 3,647,718; 3,657,154; 3,663,165 and 3,932,268. In the processing described in some of the aforementioned patents, the preformed particles containing the reactive calcined clays also contain appreciable uncalcined (hydrous) kaolin clay. See, for example, U.S. Pat. Nos. 3,367,886; 3,367,887; 3,433,587; 3,503,900; and 3,506,594. In other processes, hydrous kaolin is absent. See, for example, U.S. Pat. Nos. 3,647,718; 3,657,154; 3,663,165 and 3,932,268.

One effect of including hydrated clay in the preformed reactants in in situ processes is that hydrated clay is present in the formed particles after the particles undergo crystallization. Another difference results from the fact that reactant particles that exclude hydrated kaolin undergo crystallization while the preformed particles are immersed in sodium hydroxide solution as an external aqueous phase. Under these conditions, silica is leached from the preformed reactant particles and a sodium silicate mother liquor is formed. The molar ratio of $SiO_2/Al_2O_3$ in the crystallized microspheres is lower than the 2/1 $SiO_2/Al_2O_3$ ratio of the clay in the reactant particles. In contrast, when hydrated kaolin clay is a component of the preformed particles, sodium hydroxide is either initially present in or is transferred into the preformed particles which are immersed in oil during aging and crystallization. Under these conditions there is no leaching of silica from the preformed particles and the crystallized product has essentially the same $SiO_2/Al_2O_3$ composition as the preformed reactant particles. Still another difference is that when particles consisting of calcined clay are immersed or suspended in sodium hydroxide solution, e.g., the procedures described in U.S. Pat. No. 3,647,718, a zeolite, identified by X-Ray analysis as zeolite B, tends to crystallize when the crystallization of zeolite Y reaches or approaches a maximum level. Consequently, preformed reactant particles that are converted to zeolitic particles by procedures in which hydrated kaolin clay is excluded are significantly different in chemical composition from particles in which hydrated clay is present.

When using spray dried microspheres containing kaolin clay calcined to undergo the exotherm and free from hydrated kaolin, the microspheres are mixed with a solution of sodium hydroxide to form a slurry, which is then aged, typically for 4–8 hours at 100° F. and subsequently heated to crystallize a zeolite of the Y-type, typically by heating the aged slurry at about 180° F. for 20 to 25 hours. Preparation of an FCC catalyst in this manner and using small amounts of metakaolin in the form of microspheres and a major amount of kaolin calcined to undergo the exotherm in the form of microspheres is described in U.S. Pat. No. 3,647,718. Similar use of metakaolin in the form of powder and kaolin calcined to undergo the exotherm in microspheres separate from the microspheres composed of metakaolin is described in U.S. Pat. No. 3,657,154. Criteria for selecting ratios of microspheres of metakaolin to microspheres of clay calcined to undergo exotherm are set forth in U.S. Pat. No. 3,647,718 at col. 6, lines 3 to 18. Silica originally in the microspheres is leached or extracted during the reaction, producing a sodium silicate mother liquor which is removed in whole or in part from the crystallized microspheres. The $Na_2O/SiO_2$ molar ratio of this mother liquor is within the range of about 0.4 to about 0.6, most typically about 0.52. Hence, the material is generally referred to as "sodium disilicate". Crystallization is terminated when a desired amount of sodium zeolite Y is present in the crystallized microspheres. Typically about 20 to 25% zeolite Y is present. The microspheres usually also contain a small amount, typically less than about 5% as estimated from X-Ray patterns, of the zeolite known in the art as sodium zeolite B. The microspheres containing the mixture of sodium zeolite Y and a silica-depleted (alumina enriched) residue of calcined clay must be subjected to ion-exchange treatment to replace sodium ions with more desirable cations. Typically, ammonium ions or ammonium and rare earth ions are used in the exchange treatment(s). The zeolite Y component of the catalyst generally has a $SiO_2/Al_2O_3$ molar ratio above 4.5 but the overall $SiO_2/Al_2O_3$ molar ratio of the composite particles is generally about 1, e.g., from about 1.3 to about 1.0. Thus, the $SiO_2/Al_2O_3$ molar ratio of the catalyst product is roughly half of the $SiO_2/Al_2O_3$ ratio of the kaolin clay feed which is about 2.

The microspheres of calcined clay used as reactants generally have an average diameter of about 60 to 70 microns and contain a minimal amount, e.g., 3–5% weight percent, of particles finer than 20 microns, equivalent spherical diameter. Typically, the largest particles have a diameter of about 150 microns. The reason for restricting fines in the microspheres used as a reactant is that the microspheres retain substantially the same size and shape during aging and crystallization and the content of particles finer than about 20 microns in the finished crystallized catalyst product should be limited because they are difficult or impossible to retain in fluid catalytic cracking units. Furthermore, fines introduced with the reactants and/or generated during processing interfere with the operation of filtration equipment used in carrying out the ion-exchange treatment necesssary to convert the crystallized microspheres into catalytically active and selective particles.

When the foregoing production scheme is conducted on a commercial scale some fines (e.g., particles finer than about 20 microns equivalent spherical diameter) are generated during aging and/or crystallization. These fines contain about 20 to 40% sodium zeolite Y (as estimated by quantitative X-ray diffraction determinations). There is an indication that at least part of the zeolite Y in the fines results from a chemical reaction carried out in the aqueous phase (in contrast to zeolite that is present as a result of breakdown of crystallized microspheres). In carrying out experimental work that led to the present invention it was found that the fines typically also contain significantly more of the zeolite having the X-Ray pattern of zeolite B than is contained in the crystallized microspheres. For examples, typical minus 20 micron fines contain zeolite B in amounts (estimated from X-Ray) to be about 20 to 40% by weight. Also present is amorphous silica-alumina derived at least in part from calcined clay. A small amount of filter aid material (e.g. diatomaceous earth) is also present in fines from a commercial plant. The origin of such material will be explained subsequently.

The fines generated as a side stream are advantageously removed from the mainstream of crystallized microspheres before the crystallized microspheres undergo filtration to remove the mother liquor. Removal of the fines can be accomplished by passing the slurry of crystallized microspheres and mother liquor through one or more hydroclones before the slurry undergoes filtration. In the hydroclones grade material is discharged as the underflow effluent and is fed to the deliquoring filter. The overflow effluent from the primary hydroclones is combined with the filtrate from the deliquoring filter and run through a secondary hydroclone. The underflow again goes to the deliquoring filter and the overflow becomes the "unclarified" silicate. Mother liquor is separated from the fines for eventual concentration and sale. Such a concentrated mother liquor by-product typically contains about 15% by weight $Na_2O$, 29% by weight $SiO_2$ and 0.1% $Al_2O_3$, the balance being water. A conventional rotating drum filter precoated with a filter aid such as diatomaceous earth is used to remove the fines from the sodium disilicate liquor. The fines build up on the filter and are gradually scraped as a moist cake from the surface of the drum. The cake removed from the filter is also associated with entrained sodium disilicate solution, typically in amount corresponding to about 3–5% $SiO_2$ (weight basis), based on the dry weight of the fines. The material removed from the filter has been handled in the past as waste material, creating a potential disposal problem.

Procedures for preparing fluid zeolitic cracking catalyst particles that involve mixing additional sodium silicate solution with zeolite crystals and spray drying the slurry to form microspheres are known. Reaction products containing synthetic faujasite and obtained from sodium hydroxide solution and a mixture of calcined kaolin clay are used in processes described in the following: U.S. Pat. No. 3,515,683; U.S. Pat. No. 3,451,948; and U.S. Pat. No. 3,458,454 all assigned to Air Products and Chemicals, Inc. In these processes the zeolite-containing reation products are ground before spray drying. A grinding step is also utilized when the feed to the spray dryer is obtained by reacting calcined clay and sodium hydroxide solution in the absence of hydrated clay. See U.S. Pat. No. 3,515,682, also assigned to Air Products and Chemicals, Inc.

An attempt by one of the coinventors in the subject application to bind the drum fines produced as a side stream of a commercial process for producing fluid cracking catalysts by in situ reaction of preformed microspheres consisting of calcined kaolin clay was successful when the processing simply involved spray drying and ion-exchange. The fines used in the tests are believed to have contained appreciable grade-size microspheres. Surprisingly, when hydroclones were installed in the plant and operated such as to further reduce the losses of grade-size microspheres in the fines, the same processing was unsuccessful. Products with acceptable attrition resistance could not be obtained. In some instances, the spray dried microspheres did not appear to be sufficiently hard to survive ion-exchange in commercial equipment. It is believed that the attrition-resistant grade size crystallized microspheres present in the drum fines obscured the problem that was encountered when substantially all of the solids in the spray dryer feed was 20 microns or finer. In unsuccessful attempts to solve the problem, the prior art practice of grinding before spray drying was adopted. Surprisingly, grinding did not solve the attrition-resistance problem. Furthermore, when a grinding step was used, the ion-exchanged products were unexpectedly less active in cracking gas oil feedstocks than products obtained from the same filter drum fines without a grinding step. These difficulties, and the failure of prior art techniques to solve them, are now attributed to differences in composition between the materials previously bonded with sodium silicate and the "drum fines" essentially free of grade microspheres. Furthermore, it now is recognized that the hardness standards for present day commercial cracking catalysts are more stringent than they were when the patents above-noted were granted.

THE INVENTION

By the process of the invention, the substantially −20 micron particle size material from the manufacture of zeolitic cracking catalysts by the in situ process is converted into fluidizable zeolitic microspheres that are sufficiently attrition resistant to undergo ion-exchange treatment, resulting in fluidizable particles of cracking catalyst sufficiently attrition resistant for use in cracking hydrocarbon feedstocks. Cracking catalysts of the invention are active, selective and are sufficiently attrition-resistant to be useful in most present day FCC units. The catalysts of this invention differ in chemical composition and performance characteristics from fluid catalysts obtained by the in situ processing that gives rise to the generation of the fines used as feed material in the process of the invention. For example, catalysts of the invention have different pore structure and chemical composition. Catalysts of the invention show promise in cracking heavy feedstocks such as those containing residual fractions of crudes because of the unusually low levels of coke and hydrogen production when used in cracking petroleum feedstocks. Thus, the invention provides a means for producing a family of catalysts which differ in end-use application. For example, a plant using the invention and formerly producing active, selective catalysts useful in cracking conventional gas oil feedstocks and discarding fines as a waste material now has the additional capability of supplying catalysts suitable for cracking heavier feedstocks and/or the means to meet the needs of refineries, which, because of equipment constraints, seek to minimize coke and hydrogen formation even when using conventional gas oil feedstocks.

In accordance with the process of the invention, unwashed, undried and unground fines, which contain sodium zeolite Y, sodium zeolite B, amorphous silica-alumina and entrained sodium silicate mother liquor solution, preferably fines that are 20 microns or finer, are mixed with additional sodium silicate solution having a controlled $Na_2O/SiO_2$ molar ratio and the mixture is spray dried, also under controlled conditions, followed by acidification to gel silica introduced as sodium silicate. The microspheres then undergo ion-exchange without being dried during the exchange treatment. The sodium silicate solution should preferably have a high $Na_2O/SiO_2$ ratio in order to reproducibly manufacture catalysts of adequate attrition resistance. It has been found, unexpectedly, that an increase from about 0.3 to about 0.5 in this ratio resulted in increased attrition-resistance, all other variables being constant. A preferred $Na_2O/SiO_2$ molar ratio is in the range of about 040 to 0.55. As mentioned above, the mother liquor produced during the crystallization of faujasite zeolite in microspheres made from kaolin that has been calcined through its exotherm has a $Na_2O/SiO_2$ molar ratio within the preferred range. Consequently, when such mother liquor is used in the spray drying step, two by-product streams of the basic process may be combined to provide novel cracking catalysts.

An aspect of the preferred embodiment of the invention relates to a process for producing a family of fluid cracking catalysts, members of the family differing in composition and performance when used in catalytic cracking. The process comprises producing a family of fluid cracking catalysts, members of the family differing in composition and performance when used in catalytic cracking, the process comprising:

(a) mixing microspheres of kaolin clay calcined to undergo the exotherm with a sodium hydroxide solution, metakaolin being optionally present, (b) heating the mixture until crystals of sodium zeolite Y form in the microspheres and silica is leached therefrom, resulting in the formation of microspheres containing sodium zeolite Y and also the silica-depleted residue of calcined kaolin clay, and a sodium disilicate mother liquor containing fine particles of sodium zeolite Y, sodium zeolite B and amorphous alumina-silica.

(c) separating microspheres from step (b) from the mother liquor under conditions such that ultrafine (e.g., substantially −20 micron) sized crystals of zeolite Y and other ultrafine (e.g., substantially −20 micron) sized solids are recovered as an aqueous effluent;

(d) recovering the ultrafine sized crystals of sodium zeolite Y and other ultrafine solids from the aqueous phase;

(e) without washing, drying or grinding, mixing the recovered solids from step (d) with a solution of sodium silicate, preferably a solution of sodium disilicate, to form a slurry, (f) spray drying the slurry from step (e) to form microspheres comprising the ultrafine sized solids recovered in step (d)

(g) separately acidifying slurries of at least a portion of the zeolite-containing microspheres from step (b) and at least a portion of the zeolite containing microspheres from step (f), and separately ion-exchanging the microspheres in the slurries thus-acidified to replace sodium with more desirable cations;

(h) and recovering, as separate products, the two different types of ion exchanged zeolitic microspheres, the microsphere resulting from the separation in step (b) having an overall $SiO_2/Al_2O_3$ molar ratio appreciably less than 1.5/1, e.g., about 1/1, and the microspheres resulting from the recovery of solids in step (d) followed by spray drying in step (f) having an overall $SiO_2/Al_2O_3$ molar ratio greater than 1.8/1, e.g., about 2.2/1.

DESCRIPTION OF PREFERRED EMBODIMENTS

Preparation of Feed Material for Carrying Out Process of the Invention

The substantially −20 micron sized fines that are recovered and converted, in accordance with the present invention, into a fluid cracking catalyst may be obtained in commercial implementation of procedures such as those described in U.S. Pat. No. 3,647,718, the entire contents of which are incorporated herein by cross-reference. The method includes the steps of spray drying hydrated kaolin clay to form microspheres of hydrated kaolin clay, calcining the microspheres under conditions such that the clay in the microspheres undergoes the characteristic exotherm, suspending the calcined microspheres in an aqueous sodium hydroxide solution preferably also containing metakaolin, preferably in the form of microspheres, and reacting the micrspheres to convert the microspheres into a mixture of synthetic crystalline faujasite (sodium form) and a silica-alumina residue of calcined clay.

The bulk of the mother liquor (sodium silicate solution) is separated from the crystallized microspheres and the microspheres are optionally washed with water. Separation and washing can be carried out on a vacuum belt filter, used in conventional manner. The resulting cake of zeolitic microspheres is used as feed material for ion-exchange which may be carried out on belt filters using, for example, the continuous counter current procedure described and illustrated in U.S. Pat. No. 4,048,284. This cake constitutes the mainstream of catalyst production in practice of the preferred embodiment of this invention. Certain grades of the mainstream of catalyst production may be prepared by ion-exchanging with rare earth ions after exchanging with ammonium ions. Catalysts thus obtained typically have an overall $SiO_2/Al_2O_3$ mole ratio in the range of about 1.3 to 1.0. Catalysts having $SiO_2/Al_2O_3$ ratios at the upper end of the range may be produced by restricting the amount of mother liquor removed from the crystallized microspheres during washing. Catalysts products typically contain about 20-25% zeolite Y (determined by X-Ray diffraction of zeolite in sodium form), the zeolite Y having a $SiO_2/Al_2O_3$ molar ratio above 4.5, e.g., 4.7.

In practice of the preferred embodiment of the present invention, a family of cracking catalysts is produced. One part of the family is obtained from grade sized crystallized microspheres and the other part of the family is derived from the minus 20 micron fines present in the mother liquor. After the fines are physically isolated from the crystallized microspheres, the processing streams containing the fines are maintained separate from those containing the crystallized microspheres. Thus, these streams are separately subjected to ion exchange. It is desirable to prevent losses of the nominally 20 micron and finer particles into the grade sized crystallized microspheres in order to maximize production of both catalysts.

Hydroclones of conventional design can be used to separate a portion of the fine particles and mother liquor from the slurry of crystallized particles in mother liquor.

A conventional vacuum belt filter can be used to drain the remainder of mother liquor from the crystallized microspheres. The size of the openings in the weave of the fabric on the belt and the amount of vacuum applied will influence the size of particles that pass into the filtrate. One or more additional hydroclones may be used to remove grade size microspheres from the filtrate and return them to the mainstream process; leaving the nominally −20 micron sized particles in the filtrate. The aqueous effluent containing fine particle sized solids from the vacuum filters or from the hydroclones is then processed to remove the solid suspended particles which are then used as feed material in the process of the invention.

Particle size of the feed for the process of the invention is typically 10% to 70%−1 micron equivalent spherical diameter, preferably 50 to 70%−1 micron. Particle sizes are determined by measurement on a conventional sedigraph instrument. The present invention is especially applicable to processing fines that are associated with minimal amounts of grade material, i.e. attrition resistant microspheres larger than about 20 microns. Generally, less than 20 weight percent, preferably less than 10% and, most preferably less than 5% of grade material is present in the fines.

Feed material for use in the process of invention has been obtained by scraping filter cakes from commercial rotary vacuum filters that had been precoated with diatomaceous earth filter aid, collecting the cakes over a period of time and analyzing the cakes. Grade material had been removed from the mother liquor prior to charging the mother liquor to the drum filters. The average chemical composition of the cake was found to be as follows: 52.9% $SiO_2$; 31.0% $Al_2O_3$; 12.7% $Na_2O$; 1.26% $TiO_2$ and 0.44% $Fe_2O_3$. In the analyses, the chemical composition is reported on a volatile free weight basis.

The sodium zeolite Y content of representative feed material was in the range of 22-28%. Typical $SiO_2/Al_2O_3$ molar ratio of this component was about 4.2. BET surface area was in the range of 250-350 $m^2/g$ for representative feed material. Pore structure was typically as follows:

| | Pore Diameter Ranges | | |
|---|---|---|---|
| | 20-100A | 100-600A | 600-20KA |
| Pore Volume (Average) cc/g | 0.070 | 0.030 | 0.29 |

In making the determination of zeolite content, surface area and pore structure, samples were dried but not washed before analysis.

Feed material scraped as filter cake from the precoated drum filters typically contains about 35-40% by weight of water. The cake should not be washed, dried or ground before it is mixed with sodium silicate solution and spray dried. The sodium silicate should be one having a sufficiently high $Na_2O/SiO_2$ ratio to be soluble at the concentration it is used. Commercial sodium silicate such as N ® Brand ($Na_2O/SiO_2$=about 0.31) can be used. This material is supplied as a solution containing about 62 weight % water and can be used without dilution or further concentration. Preferably, the sodium silicate has a higher $Na_2O/SiO_2$ molar ratio than 0.31 e.g., a ratio of about 0.40 to 0.55. Solutions which have $Na_2O/SiO_2$ ratios in this range are referred to as herein as "sodium disilicate" although the silica content may be somewhat less than or more than that of a material whose analysis corresponds to $Na_2O:2.0\ SiO_2$.

Sodium disilicate solutions of about 40% solids ($Na_2O$ plus $SiO_2$) can be used without dilution or further concentration. Sufficient sodium silicate is added to result in the incorporation of about 10% to 35% $SiO_2$ by weight, preferably about 20% by weight, in the ion-exchanged microspheres, the weight of the added silica being based on the dry weight of the microspheres.

Conventional spray driers can be used to convert the mixture of substantially −20 micron sized fines and sodium silicate solution into microspheres having an average diameter of about 60 to 80 microns. In operating the spray driers, the air outlet temperatures should be low, e.g., 120° C. or below, in order to produce microspheres of sufficiently high bulk density, i.e., about 0.85 cc/g or above, preferably 0.90 cc/g or above, and most preferably 0.95 cc/g or above. Air inlet temperatures in the range of about 250° to 600° C. are recommended. It has been found that spray dried microspheres having a bulk density below the preferred limits may have insufficient attrition-resistance to survive intact during the extensive ion-exchange treatment that is required. Also products of relatively low bulk density and inadequate attrition resistance, for example 3.5 or above by the EAI test procedure, may be obtained.

The spray dried microspheres are strongly alkaline and a slurry of the microspheres should be acidified prior to and during ion-exchange with solutions of one or more ammonium salts. In practice, the acidification can be carried out by addition of a concentrated acid, e.g. nitric acid, to the exchange solution of ammonium salts throughout the introduction of microspheres. It is desirable to maintain a pH low enough to ensure gellation of the silica but not destroy the zeolite content of the microspheres. Optimally the pH should be in the range of 3–5.

Conventional means and conditions can be used to replace sodium in the spray dried microspheres with ammonium ions supplied by an aqueous solution of one or more ammonium salts. Sufficient sodium should be exchanged to reduce the Na$_2$O to a value below 1%, preferably below 0.5% and most preferably below 0.4%. Successive treatments have been required to reduce sodium to these low levels and for this reason the spray dried microspheres must be adequately attrition resistant. The ammonium exchange treatment should be followed by ion-exchange with rare earth ions, e.g., cerium ions or a mixture of rare earth ions. Generally, sufficient rare earth should be introduced to result in products containing at least 2.0% by weight rare earth(s) expressed as the oxide(s) (REO), preferably 2.5 to 4.0% REO and, most preferably 2.7 to 3.5% REO.

It should be noted that once the dried microspheres have been acidified they should not be dried until the rare earth exchange treatment is complete. In other words, once wetted during acidification the microspheres should not be dried until ion-exchange is complete. Conventional driers, such as a flash dryer, can be used to dry the microspheres after the termination of ion-exchange.

The products are exposed to temperatures above about 1000° F. in an atmosphere comprising water vapor prior to or during use in a refinery. Such steaming treatment brings about changes in pore structure, discussed below, and may in some instances decreases the Engelhard Attrition Index; i.e., improve attrition resistance.

Catalyst Products of the Invention

Catalyst of the present invention have sufficient attrition resistance for use in many commercial FCC units. In particular, the Engelhard Attrition Index (hereinafter "EAI") of products of the invention as determined by the procedure described in the publication entitled "Engelhard Attrition Index," is less than 2.5, preferably less than 2.0, and most preferably 1.8 or below, prior to steaming. This publication is available to members of the public, upon request, at the Technical Information Center of Engelhard Corporation, Menlo Park, N.J. (Dewey Decimal Number 665.533 EC/EAI). Bulk density is in the range of about 0.85 to 1.10 cc/g, preferably about 0.90 to 1.10 cc/g, and most preferably about 0.95 to 1.10 cc/g.

Preferred catalysts contain about 20–30% by weight zeolite Y. The percentage of Y-faujasite zeolite in the catalyst of the present invention is best determined when the zeolite is in the sodium form using the technique described in the ASTM standard method of testing titled "Relative Zeolite Diffraction Intensities" (Designation D3906-80) or by an equivalent technique. When analyzed in rare earth exchanged form, the apparent content of Y zeolite will be lower, typically about 15%, due to absorption of X-rays by rare earth ions. although zeolite B is a component of the feed material such zeolite is not detectable by X-ray diffraction in the product after the ion-exchanged product is calcined or steamed. In other words, the B zeolite is converted into an amorphorus silica-alumina matrix component before or during use in a refinery.

The Y-zeolite component of the present invention, in its sodium form, generally has a crystalline unit cell size of less than about 24.75A and most preferably less than about 24.72A. Typically, the zeolite Y component of the microspheres has a crystalline unit cell size of about 24.69–24.72. It is believed that unit cell size range of between 24.69–24.72 corresponds to a SiO$_2$/Al$_2$O$_3$ molar ratio of the zeolite Y of about 4.54–4.20.

The catalysts of the present invention (including both the zeolitic and non-zeolitic components) preferably have a SiO$_2$/Al$_2$O$_3$ molar ratio of about 2.0 and contain less than about 0.4% by weight sodium oxide (Na$_2$O) and more than about 2.5% by weight rare earth oxides(s) (REO). For the purpose of this application, all percentages of Na$_2$O and REO in the zeolite-containing microspheres are calculated on a volatile free basis. The quantity of volatile material in the microsphere is determined by measuring the weight loss of the microspheres after they were calcined first for ½ hour at about 800° F. and then for 1 hour at about 1830° F.

A chemical composition of a representative product (reported on a volatile-free weight basis) is 69.7% SiO$_2$; 26.3% Al$_2$O$_3$; 0.29% Na$_2$O; 1.04% TiO$_2$; 0.35% Fe$_2$O$_3$; 3.63% REO (rare earth oxide). This analysis is reported for illustrative purposes since products of the invention will differ from each other in composition, depending inter alia on the chemical analysis of the feed material, amount of silica added as sodium silicate and the ions used in the exchange steps(s).

Surface area of representative catalysts is in the range of about 225 to 325 m$^2$g, typically about 270 m$^2$/g. Pore structure of a representative product (before calcination and/or steaming) is as follows:

|  | Pore Diameter Ranges | | |
| --- | --- | --- | --- |
|  | 20–100A | 100–600A | 600–20KA |
| Pore Volume (cc/g) | 0.123 cc/g | 0.027 cc/g | 0.121 cc/g |

A characteristic of catalysts of the invention is that pore structure is changed by steaming to an extent which varies with steaming conditions. In particular, microporosity (porosity in the range of 20–100A) is decreased and there is a corresponding increase in mesoporosity (100–600A dia range) and macroporosity (600–20,000A dia range). The effect is illustrated by the following data which was generated by steaming a sample of a catalyst of the invention analyzing 0.54%

Na$_2$O and 2.7% REO with 100% steam at various temperatures for 4 hours. A sample of the same catalyst was calcined in air for purposes of comparison.

| Heat Treatment | Pore Size Range | | | BET Surface Area m$^2$g |
|---|---|---|---|---|
| | 20–100A | 100–600A | 600–20KA | |
| | Pore Volume, cc/g | | | |
| Calcination 1 hr./1100° F. | 0.110 | 0.026 | 0.130 | 267 |
| Steamed 4 hrs./1400° F. | 0.065 | 0.057 | 0.129 | 113 |
| Steamed 4 hrs./1450° F. | 0.051 | 0.054 | 0.145 | 69.8 |
| Steamed 4 hrs./1500° F. | 0.042 | 0.051 | 0.136 | 40.4 |

Catalysts of the present invention preferably have less than about 0.15 cc/g of pores having diameters in the range of 20–100A, less than about 0.08 c/g of pores having diameters in the range of 100–600A and at least about 0.10 cc/g. of pores having diameters in the range of 600–20,000A, a surface area of about 225–325 m$^2$/g, and a bulk density of the 200/270 mesh fraction of about 0.95 g/cc, as determined by the following techniques:

The surface area and the volume of pores having diameters in the range of 20–100A and 100–600A were determined by conventional nitrogen adsorption and desorption techniques, respectively, using a Micromeritics ® Digisorb 2500 Automatic Multi-Gas Surface Area and Pore Volume Analyzer. Before being tested for surface area and volume of pores having diameters in the range of 20–100A and 100–600A, the microspheres were first pretreated by heating them, under vacuum, at about 480° F. for 16 hours.

The volume of pores having diameters in the range of 600–20,000A was determined by a conventional mercury intrusion porosimetry technique using a scanning mercury porosimeter manufactured by Quantachrome Corp. The relationship between pore diameter and intrusion pressure was calculated using the Washburn equation and assuming a contact angle of 140° and a surface tension of 484 ergs/cm$^2$. Before being tested for volume of pores having diameters in the range of 600–20,,000A, the microspheres were pretreated by heating them, in air, to about 660° F. for one hour and then cooling them in a dessicator.

The bulk density of the 200/270 mesh fraction of the microspheres was calculated using the procedure described in the publication entitled "Engelhard Attrition Index" referred to above. In particular, the bulk density was calculated by dividing the weight of the "original sample" by the volume of that sample (0.661 cc). The microspheres used to prepare the "sample volume" did not require any treatment for removal of electrostatic charge and were equilibrated at 30–70% relative humidity.

Performance Characteristics of Catalysts of the Invention

The activity of the catalysts is within the range of that of present day cracking catalysts having intermediate activity. The outstanding performance characteristic of catalysts of the invention is low coke and hydrogen production. Consequently the catalysts can be used in cracking conventional gas oil feedstocks and show special promise when using such feedstocks in FCC units in which coke production and/or hydrogen production should be limited because of constraints imposed by the operation of the regenerator or by limitation in gas compressors. Also, the low coke formation and hydrogen production indicate that the catalysts will be of special utility when the feed-stock contains resid.

The following examples are given for illustrative purposes.

EXAMPLE 1

The feed material used in this example was a sample of the fine (−20 micron) particle size fraction recovered as a moist cake from drum filters operating in a commercial plant utilizing procedures substantially as described in U.S. Pat. No. 3,647,718. The solids in the filter cake had a chemical analysis of representative fine feed material (described above) and analyzed 35% weight volatile matter. The feed contained approximately 25% zeolite Y (the balance being a mixture of diatomaceous earth and the crystallization residue of calcined clay).

A 16.6 Kg sample of the feed was slurried in 9.66 Kg of sodium silicate solution (28.5% SiO$_2$) having a Na$_2$O/SiO$_2$ molar ration of 0.52. This mixture was spray dried using a nozzle atomization drier, maintaining inlet temperature of 250°–275° C. and an outlet temperature <120° C. The resulting microspheres were then exchanged with ammonium nitrate to a level of 0.37% Na$_2$O while maintaining pH between 3 and 4. Without drying the ion-exchanged microspheres, they were then exchanged with a lanthanum rich mixture of rare earth ions at 180° F. for 2 hours. The resultant rare earth ion-exchanged microspheres contained 2.70% REO. The mixed earth ions were supplied as an aqueous solution of the nitrate salts.

The resulting catalyst had an EAI of 1.1 after calcination for one hour at 1100° F. Catalytic properties, based on MAT testing*, are summarized below:

| Steaming treatment (100% steam) | 4 hrs./ 1400° F. | 4 hrs./ 1450° F. | 4 hrs./ 1500° F. |
|---|---|---|---|
| wt % Conversion | 83.7 | 78.1 | 68.5 |
| wt % Gasoline (C5 to 421° F. boiling) | 55.9 | 56.5 | 52.8 |
| wt % LCO (421–602° F. boiling) | 11.9 | 15.2 | 19.8 |
| wt % Gas (C4 and lighter) | 19.9 | 16.0 | 12.0 |
| wt % Coke | 7.84 | 5.50 | 3.63 |

*WHSV = 15, c/o = 5, Temperature = 910° F.

EXAMPLE 2

A 16.00 Kg sample of moist filter cake having a composition similar to that used in Example 1 (41% volatile matter) was slurried in 8.43 Kg of sodium silicate solution (28.5% SiO$_2$) having a Na$_2$O/SiO$_2$ wt. ratio of 0.31. The catalyst product analyzed 0.78% Na$_2$O and 3.60% REO. This catalyst had an EAI of 1.8 after calcination for one hour at 1100° F.

In the foregoing examples, the feed material included diatomaceous earth that had been used as a filter aid. The inventors believe that filter aid material other than diatomaceous earth can be present in the feed provided that such material when present as a component of catalysts of the invention will not promote structural collapse of the zeolitic or other components during catalyst poduction or use in an FCC unit.

We claim:

1. A process for producing an attrition-resistant zeolitic cracking catalyst which comprises providing a finely divided mixture comprising particles of sodium zeolite Y, sodium zeolite B and amorphous silica-alumina, mixing said mixture of particles with a solution of sodium silicate to form a slurry without milling, washing or drying said mixture prior to or subsequent to addition of sodium silicate, spray drying said slurry to form microspheres, forming an acidic slurry containing said microspheres and then subjecting the microspheres to ion-exchange treatment to reduce the sodium content thereof without an intermediate drying step.

2. The process of claim 1 wherein said mixture comprises about 20–40% sodium zeolite Y, about 20–40% sodium zeolite B and the balance being amorphous silica-alumina.

3. The process of claim 2 wherein said mixture is obtained as a by-product in the manufacture of a fluid cracking catalyst from microspheres of calcined clay and sodium hydroxide solution.

4. The process of claim 3 wherein said sodium silicate is sodium disilicate obtained as a by-product in the manufacture of fluid cracking catalyst.

5. The process of claim 1 wherein sufficient sodium silicate is present in the microspheres produced by spray dryer to result in the incorporation of about 10% to 35% $SiO_2$ by weight in the ion exchanged microspheres, said weight being based on the dry weight of said microspheres.

6. A fluid cracking catalyst produced by the process of claim 1.

7. The catalyst of claim 6 which has a surface area in the range of 225 to 325 $m^2/g$; and a pore structure characterized by less than 0.15 cc/g porosity in the 20 to 100A diameter range; and an Engelhard Attrition Index below 2.

8. A process for producing a family of fluid cracking catalysts, members of said family differing in overall composition and performance when used in catalytic cracking, said process comprising:

(a) mixing microspheres of kaolin clay calcined to undergo the exotherm with a sodium hydroxide solution, metakaolin being optionally present, (b) heating the mixture until crystals of sodium zeolite Y form in the microspheres and silica is leached therefrom, resulting in the formation of a sodium disilicate aqueous mother liquor, ultrafine solids comprising sodiyn zeolite Y, and microspheres containing sodium zeolite Y and also the silica-depleted residue of calcined kaolin clay;

(c) separating said microspheres containing zeolite Y from step (b) from said sodium disilicate aqueous mother liquor under conditions such that said ultrafine crystals of zeolite Y and other ultrafine solids remain in the aqueous effluent, whereby zeolite Y is present in both the microspheres separated in step (c) and the aqueous effluent from step (c)

(d) recovering said ultrafine crystals of sodium zeolite Y and the other ultrafine solids from the aqueous effluent in step (c);

(e) mixing the recovered ultrafine solids from step (d) with sodium silicate to form a slurry, (f) spray drying said slurry from step (e) to form microspheres comprising ultrafine solids recovered in step (d) and including crystals of sodium zeolite Y;

(g) separately acidifying at least a portion of the zeolite Y-containing microspheres obtained in and recovered in step (c) step (b) and at least a portion of the zeolite Y containing microspheres from step (f), and ion-exchanging the microspheres in the slurries thus-acidified to replace sodium with more desirable cations;

(h) and recovering as separate products the two different types of ion exchanged microspheres, both types of microspheres comprising zeolite Y, the microsphere resulting from the separation in step (c) having an overall $SiO_2/Al_2O_3$ molar ratio appreciably less than 1.5/1 and the microspheres resulting from the separation of ultrafine solids in step (c) and recovery in step (d) followed by spray drying in step (f) having an overall $SiO_2/Al_2O_3$ ratio greater than 1.8/1.

9. The process of claim 8 wherein the sodium silicate used in step (e) is sodium disilicate.

10. The process of claim 8 wherein the sodium silicate used in step (e) is obtained from sodium disilicate formed in step (b) and separated as mother liquor in step (c).

11. The process of claim 8 wherein substantially all of the solids recovered in step (d) are finer than about 20 microns equivalent spherical diameter.

12. The process of claim 8 wherein the material recovered in step (d) comprises about 20 to 40% sodium zeolite Y and about 20 to 40% sodium zeolite B.

13. The process of claim 8 wherein the material recovered in step (d) is saturated with sodium disilicate.

14. The process of claim 8 wherein the microspheres from step (f) are ion-exchange with an ammonium salt to reduce the sodium content and then ion-exchanged with a rare earth salt without an intermediate drying step.

15. The process of claim 14 wherein said ultrafine solids are not successively ion-exchanged with an ammonium salt until the $Na_2O$ content is below about 0.5.

16. The process of claim 8 wherein sufficient sodium silicate is added in step (e) to result in a product containing about 10% to 35% by weight $SiO_2$ derived from sodium silicate.

17. The process of claim 8 wherein the product contains about 20% by weight $SiO_2$ derived from sodium silicate.

* * * * *